US010824403B2

(12) United States Patent
Fukala

(10) Patent No.: US 10,824,403 B2
(45) Date of Patent: Nov. 3, 2020

(54) APPLICATION BUILDER WITH AUTOMATED DATA OBJECTS CREATION

(71) Applicant: ORACLE INTERNATIONAL CORPORATION, Redwood Shores, CA (US)

(72) Inventor: Marek Fukala, Przno (CZ)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 85 days.

(21) Appl. No.: 15/186,414

(22) Filed: Jun. 17, 2016

(65) Prior Publication Data

US 2017/0115968 A1   Apr. 27, 2017

Related U.S. Application Data

(60) Provisional application No. 62/245,737, filed on Oct. 23, 2015.

(51) Int. Cl.
| | |
|---|---|
| G06F 8/35 | (2018.01) |
| G06F 8/38 | (2018.01) |
| G06F 16/21 | (2019.01) |
| G06F 8/34 | (2018.01) |
| G06F 16/25 | (2019.01) |

(52) U.S. Cl.
CPC ............ *G06F 8/355* (2013.01); *G06F 8/34* (2013.01); *G06F 8/35* (2013.01); *G06F 8/38* (2013.01); *G06F 16/213* (2019.01); *G06F 16/25* (2019.01); *G06F 16/252* (2019.01)

(58) Field of Classification Search
None
See application file for complete search history.

(56) References Cited

U.S. PATENT DOCUMENTS

| | | |
|---|---|---|
| 5,418,941 A | 5/1995 | Peters |
| 8,370,219 B1 | 2/2013 | Lundquist et al. |
| (Continued) | | |

OTHER PUBLICATIONS

"Aloha Editor UI Demo", Genetics Software GmbH, Inc. "Aloha Editor UI Demo", [accessed on Aug. 5, 2015], 2015, 2 pages.

(Continued)

*Primary Examiner* — Wynuel S Aquino
*Assistant Examiner* — Mark A Gooray
(74) *Attorney, Agent, or Firm* — Kilpatrick Townsend & Stockton LLP

(57) ABSTRACT

Techniques for simplifying the process of building an application and making changes to the application. The process of creating and editing an application is simplified such that a non-technical user can build and edit applications without having any programming or technical knowledge. An infrastructure is provided for building an application that enables a user to create an application by simply designing a user interface for the application using one or more provided user interface (UI) components. A user can build a full executable application by simply using UI components and the back end data objects and schemas used for the application are automatically created and updated by the infrastructure. Due to the automatic creation of the data objects and schemas and the automatic binding of these to the UI components of the application, the application being built is able to run or execute while being built and/or edited.

19 Claims, 10 Drawing Sheets

(56) References Cited

U.S. PATENT DOCUMENTS

| | | | |
|---|---|---|---|
| 8,806,339 B2 | 8/2014 | Kim et al. | |
| 8,893,081 B2 | 11/2014 | Payzer et al. | |
| 2005/0160414 A1 | 7/2005 | Parnanen et al. | |
| 2007/0250783 A1* | 10/2007 | Wu | G06F 19/00 |
| | | | 715/762 |
| 2008/0189682 A1 | 8/2008 | Rude et al. | |
| 2011/0131512 A1 | 6/2011 | Yan et al. | |
| 2011/0307519 A1* | 12/2011 | Payzer | G06F 16/252 |
| | | | 707/792 |
| 2014/0059521 A1 | 2/2014 | Voliter | |
| 2015/0113451 A1* | 4/2015 | Kopp | G06Q 10/00 |
| | | | 715/764 |
| 2015/0347100 A1* | 12/2015 | Quine | G06F 8/34 |
| | | | 715/763 |

OTHER PUBLICATIONS

"AribaWeb MetaUI Live Editing", AribaWeb Meta UI Live Editing, [accessed on Aug. 5, 2015], 3 pages.

Transcript and associated screen shots for YouTube video "Oracle Applications Builder Cloud Service (Part 1)" by Luc Bors, dated Jun. 21, 2015 on YouTube (total length of video: XXX).

Transcript and associated screen shots for YouTube video "Oracle Applications Builder Cloud Service (Part 2)" by Luc Burs, dated Jun. 21, 2015 on YouTube (total length of video: XXX).

Transcript and associated screen shots for YouTube video "Oracle Applications Builder Cloud Service (Part 1)" by Luc Bors, dated Jun. 21, 2015 on YouTube.

Transcript and associated screen shots for YouTube video "Oracle Applications Builder Cloud Service (Part 2)" by Luc Bors, dated Jun. 21, 2015 on YouTube.

* cited by examiner

APPLICATION BUILDER WITH AUTOMATED DATA OBJECTS CREATION

CROSS-REFERENCES TO RELATED APPLICATION

This application is a non-provisional application of and claims the benefit and priority of U.S. Provisional Application No. 62/245,737, filed on Oct. 23, 2015 titled "LIVE APPLICATION EDITOR", which is herein incorporated by reference in its entirety for all purposes.

BACKGROUND

The present disclosure relates generally to computer applications, and more particularly to techniques for simplifying the process of building an application and making changes to the application.

Applications (e.g., web applications) are generally built and tested by technical people such as software engineers. An application is generally built in a design environment and then tested in a test environment. Certain levels of computer knowledge and programming skills (e.g., knowledge of a programming language) are typically required to build and test these applications. As a result, application building and testing cannot be performed by a non-technical person (e.g., a business person).

Typically, any changes to be made to an application, possibly because the end user of the application wants to change the application's functionality, have to be submitted to an engineering organization (e.g., to an Information Technology (IT) department) in the form of change requests. Engineers within the engineering organization may then make code changes to the application to implement the changes, retest the changed application, and then deploy the changed application to the users. Since making changes to an application also requires a prerequisite level of computer knowledge and programming skills, this also cannot be performed by a non-technical person such as the end user.

The end business user of an application is thus reliant on engineers for building and/or making changes to the application. This reliance creates a disconnect between the building and/or updating of applications and their use. For example, this adds a significant delay in the development of new applications and/or making changes or adding features to existing applications. In today's fast moving world, these delays are many times unacceptable and or crippling to the end business user of the application.

Today's environment demands that a business be able to adjust quickly to evolving requirements from the market, for example, in response to customers' needs, as well as to changing needs of the business's internal processes. These evolving requirements also mean that tools and applications used to run the business need to evolve in a timely manner or be replaced.

While some tools are available to simplify the process of building an application, these tools are confined to simplifying the process of building an application's graphical user interface (GUI). The person building the application still has to program the data objects that are used for storing data related to the application. These data objects then have to be programmatically wired or bound to the GUI components in order to make the application functional and executable. This again requires the application builder to have significant computer and programming skills and knowledge.

BRIEF SUMMARY

The present disclosure relates generally to computer applications, and more particularly to techniques for simplifying the process of building an application and making changes to the application.

In certain embodiments, techniques are provided for facilitating a user to build an application without having to have programing knowledge and/or skills. Techniques described herein provide an easy way for a non-technical end user to create and/or edit an application (e.g., a web based business application). Non-technical folks can easily create new applications or modify or make changes to existing applications to solve their business problems. This approach is faster and more effective than involving IT folks for building or making changes to applications. In this manner, as the business of the end user evolves, changes can be made to the application by the end user itself.

In certain embodiments, an infrastructure is provided for building an application that enables a user to create an application by simply designing a user interface for the application using one or more provided user interface (UI) components. A user can build a full executable application by simply using UI components and the back end data objects used for the application are automatically created and updated by the infrastructure. For example, if the data objects are implemented using a database, the data objects are created and updated by updating the database schema. Due to the automatic creation of the data objects and the automatic binding of the data objects to the UI components of the application, the application being built is able to run or execute while being built and/or edited.

In certain embodiments, the user is able to simultaneously edit the application and use it as if the application was running in production. This ability may be referred to as dynamic live application modelling. For example, the user may be enabled to drag and drop a UI component, such as a table component, to a view of the application. Based on this change of application view, application metadata may be updated at a client side to reflect the change, and data objects for the application may be updated at a backend server. The data objects may be updated to add a data object corresponding to the UI component or one or more attributes of a previously created data object may be updated. In certain embodiments, the data objects may be implemented in a database, for example, as tables. In such embodiments, the data objects may be created or updated by updating the database schema. For example, a table can be added to a database at the backend server corresponding to a table component added in the application by updating the associated database schema. The update of the application metadata can include updating a view structure of the application to reflect the change made to the application by the user. For example, a table view element can be added to the view structure of the application to indicate the table component has been added to the application. The update of the application metadata can also include updating mapping information for the application to reflect an association between the data object and the view element. For example, an association can be established to indicate the table view element is associated with the table data object. The application view can be updated or refreshed after the application metadata is updated. In this manner, various UI components can be added to build the application. For example, fields and forms can be added to the table component in a similar manner, and through them, the user can then enter data to have the application store updated on the backend server.

For facilitating the user to build the application, an intuitive component interface with various user interface (UI) components is provided to the user. The user can design an interface of the application by dragging and dropping a UI component from the component interface to a canvas on the fly. In some examples, the UI components that can be dragged and dropped onto the interface of the application may include UI components that enable inserting, editing, and/or deleting data in the one or more data sources. In one embodiment, the UI components include a table view such that the user is enabled to create in the interface of the application a table with various controls to view, insert, edit and/or delete data in one or more tables in a data source. When a UI component is dragged and dropped into another UI component, user intention can be estimated and one or more changes to the application metadata can be made based this estimation. For example, when the user drops a field component into an existing form component, it can be estimated that the user would like to add a new field to a business object associated with the form component; and the new field can be added to the business object as a default action. Accordingly, the application metadata can include semantics of the components.

The details of one or more embodiments are set forth in the accompanying drawings and the description below. Other features, objects, and advantages will be apparent from the description and drawings, and from the claims.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

DETAILED DESCRIPTION

Figure 1:
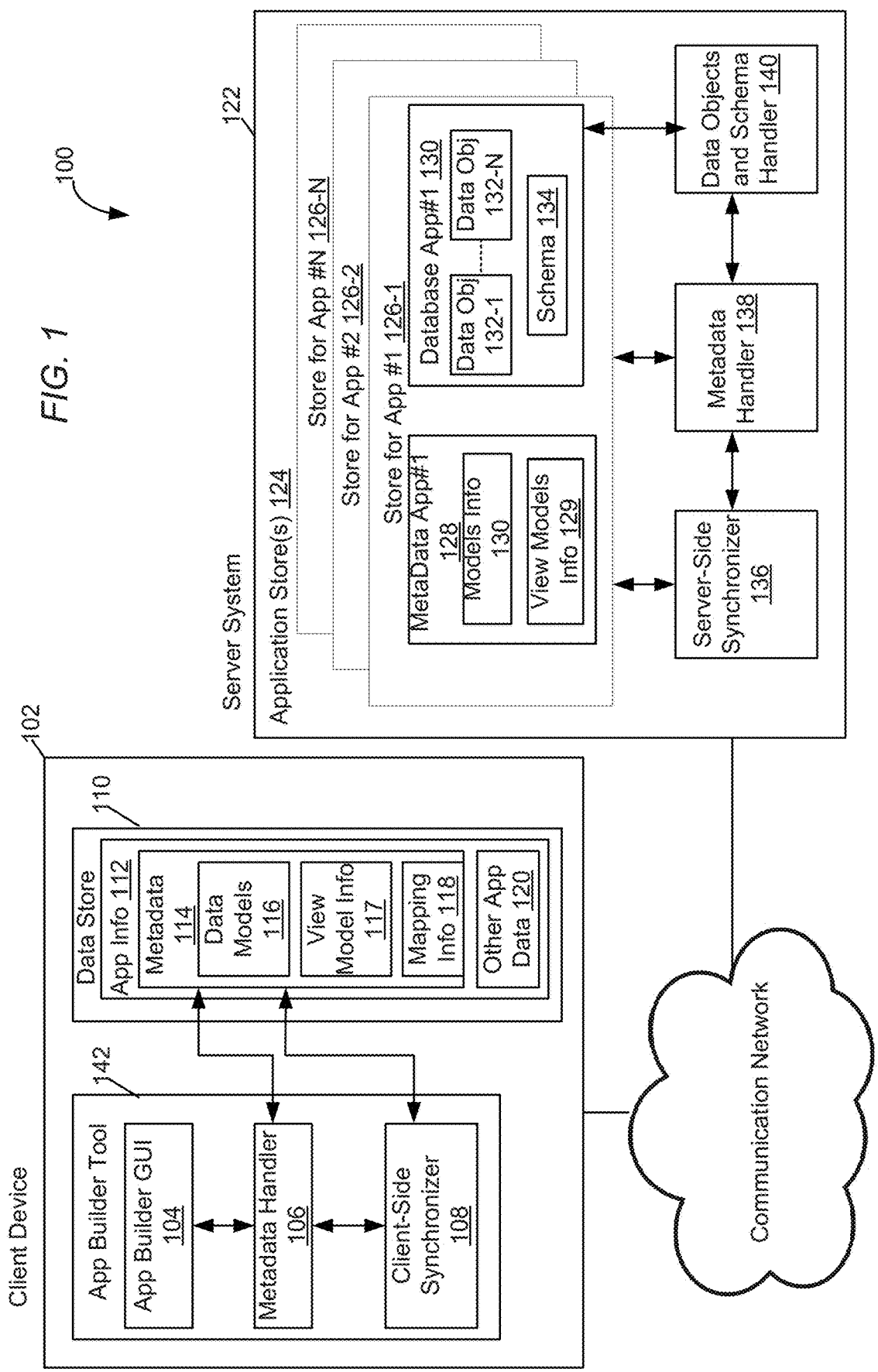
FIG. 1 shows a simplified block diagram of a distributed application development platform for facilitating a user to build an application in accordance with the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

The present disclosure relates generally to computer applications, and more particularly to techniques for simplifying the process of building an application and making changes to the application. In certain embodiments, the process of creating and editing an application is simplified such that a non-technical user can build and edit applications without having any programming or technical knowledge. This enables even a non-technical end user of an application, who has knowledge of the problem being solved by the application, to create and make edits to the application without relying upon developers or engineers or others with technical knowledge. Various different types of application may be created and/or edited including but not limited to web applications, mobile applications, enterprise applications, and the like.

In certain embodiments, an infrastructure is provided for building an application that enables a user to create an application by simply designing a user interface for the application using one or more provided user interface (UI) components. Responsive to changes made by the user in the application's user interface, the data objects for the application are automatically created. For example, if the data objects are implemented using a database, the database schema may be updated to create and or update the data objects. The data objects are also automatically bound to the UI components in the application's user interface. As changes are made to the application's user interface by the user (for example, by adding or removing one or more UI components from the application's user interface, changing one or more attributes of the UI components in the application's user interface, etc.), a view model for the application, which identifies a view structure for the application, is automatically updated. Changes to a data model for the application, which identifies the structure of data for the application, are automatically determined based upon the changed view model. As used herein, the data model of the application may be referred to a data structure that contains business objects of the application. A business object may be referred to a data structure that contains operations and/or properties. For example, a customer record may be a business object having various properties and operations. As another example, a customer list may be another business object. The data model may contain a customer record field and a customer list field. Such a data model may be used to build an application that keeps track of sales.

The changed data model is then used to automatically determine and dynamically make updates to the business objects for the application and their associated bindings. The author of an application thus can build an application by primarily working with the UI components rather than with any data objects. The author does not have to know how the data objects are implemented. The author of the application need not have any knowledge about the data or view models underlying the application or about the data objects (or database schemas if the data objects are implemented using a database) used for the application.

A user can build a full executable application by simply using UI components and the back end data objects used for the application are automatically created and updated by the infrastructure. The user thus needs to only care about how to draw the UI for the application using one or more provided user-selectable UI components and the data objects are automatically taken care of by the infrastructure. This enables non-technical users to easily create new applications and/or make modifications to existing applications without having programming or technical knowledge and without relying on or involving IT people. This in turn enables applications to be created and modified much faster than before.

In certain embodiments, due to the automatic creation of the data objects and the automatic binding of these to the UI components of the application, the application being built is able to run or execute while being built and/or edited. The application thus dynamically runs or executes while being designed. Unlike the conventional application builder tools, this enables the author of the application to see how the application executes while the user is still designing the application. This ability to be able to run an application while the application is being designed is referred to as dynamic live application modelling. The application behaves like in production even at design time. User data for the application can be seen, created, and updated via the application while the author is creating or modifying the application.

Figure 8:
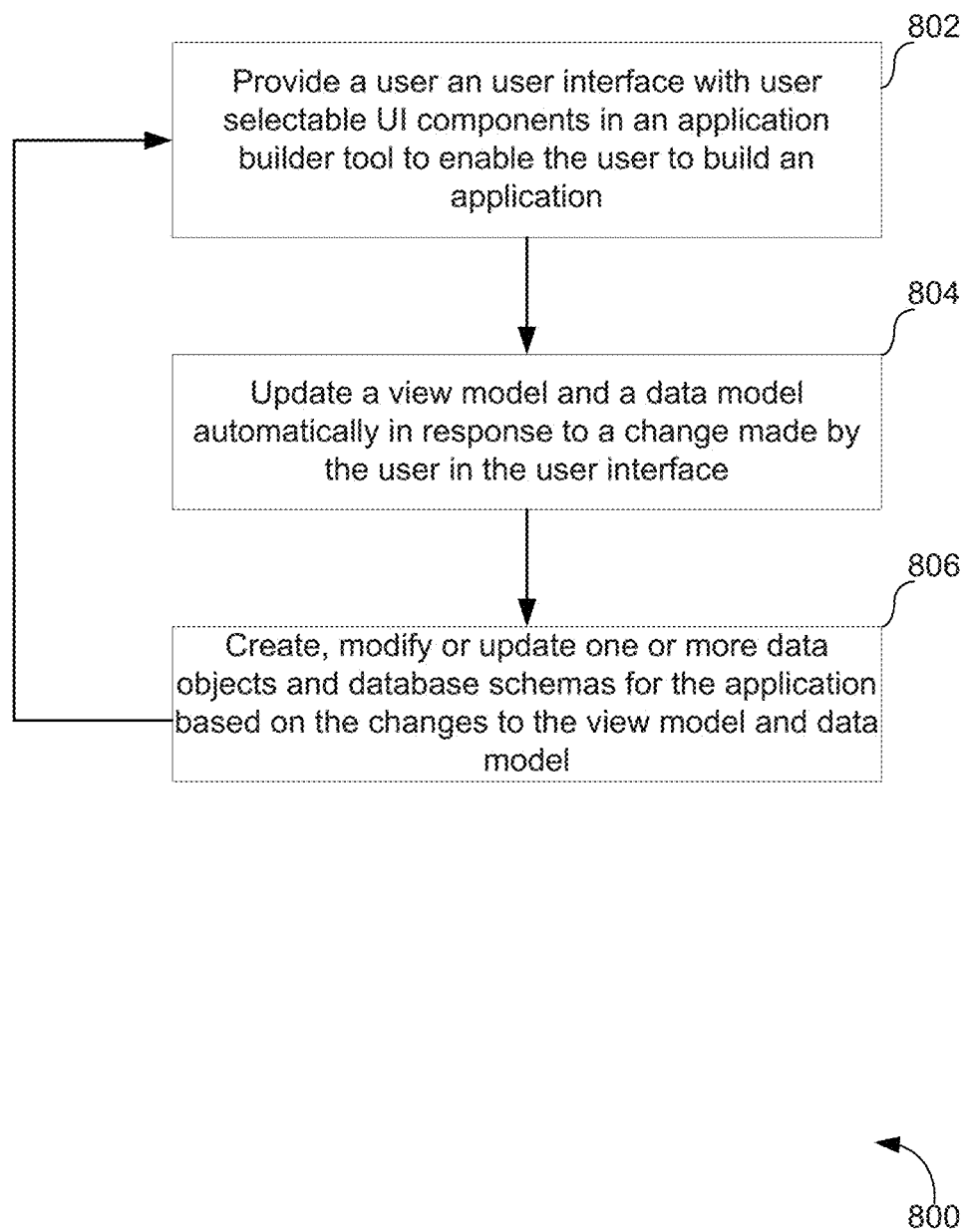
FIG. 8 illustrates a simplified high level flowchart illustrating an exemplary method for facilitating a user to build an application in accordance with certain embodiments.

FIG. 8 illustrates a simplified high level flowchart 800 illustrating an exemplary method for facilitating a user to build an application in accordance with certain embodiments. The method presented in FIG. 8 and described below is intended to be illustrative and non-limiting. The particular series of processing steps depicted in FIG. 8 is not intended to be limiting. It is appreciated that the processing steps may be performed in an order different from that depicted in FIG. 8, and that not all the steps depicted in FIG. 8 need be performed.

At 802, a user may build an application simply by designing a user interface for the application using one or more user interface components provided by an application builder tool. An example of such a tool is described below in further details. The tool may allow the user to build the user interface for the application using simple drag and drop operations. For example, a user can select a UI component from multiple UI components provided by the tool and then drag and drop the selected UI component onto an area (e.g., a canvas) for building the user interface for the application. The user can also make changes to one or more attributes (e.g., add or delete columns from a table UI component, label a button UI component, etc.) of a UI component that is part of the application's user interface.

At 804, a view model and a data model for the application are automatically, without any user intervention, updated responsive to the changes made by the user to the application's user interface in 802. The view model identifies the view structure of the application including identifying the various UI components that are part of the application view and relationship between the UI components. The data model for the application identifies the organization of data for the application. The user does not have to know anything about the view or data models. In certain embodiments, mapping information is also stored mapping the view model to the data model.

In certain embodiments, application metadata is stored for each application, where the application metadata includes metadata representing the view and data models for the application. As changes are made by the user to the application's user interface, the view model or data model are changed by automatically, without any user intervention, updating the associated metadata for the application to reflect the changes to the view or data models.

At 806, one or more data objects for the application are automatically created, modified or updated based upon changes made to the view and data models for the application in 804. For example, if the data objects are implemented using a database, the data objects may be created or updated by updating the database schema. A database schema can describe a logical structure of data within a database. For example, in response to adding a table UI component to the application' user interface, a new table data object may be created for the application in a database by modifying the database schema for the database. The mapping information is used to dynamically create bindings between the UI components in the view with the data objects corresponding to the data model.

While the user is designing the application, the application being built by the user can run like a live application. This is due to the automatic creation and update of the data objects, view structure and page view-model model, the automatic binding of these to the UI components of the application, the application being built is able to run or execute while being built and/or edited. The application thus dynamically runs or executes while being designed.

The processing in 802, 804 and 806 may be performed iteratively (represented by the arrow from 808 to 802 as the user designs and makes changes to the application's user interface. The user only needs to build the user interface in 802 and the processing in 804, 806, and 808 is performed automatically without any user intervention. In this manner, the author of the application only needs to draw the UI for an application using the provided UI components and the rest of the processing that is needed to create a functioning application is done automatically for the user. This enables even a non-technical to build an application simply by designing the user interface for the application.

The view model identifies the view structure of the application including identifying the various UI components that are part of the application view and relationship between the UI components. The data model for the application identifies the organization of data for the application. The user does not have to know anything about the view or data models. In certain embodiments, mapping information is also stored mapping the view model to the data model.

FIG. 1 shows a simplified block diagram of a distributed application development platform 100 for facilitating a user to build an application in accordance with the disclosure. As shown, application development platform 100 can include a client device 102, a server system 122, and/or any other components. Development platform 100 depicted in FIG. 1 is merely an example and is not intended to unduly limit the scope of inventive embodiments recited in the claims. One of ordinary skill in the art would recognize many possible variations, alternatives, and modifications. For example, in some implementations, platform 100 may have more or fewer components than those shown in FIG. 1, may combine two or more components, or may have a different configuration or arrangement of components. For example, while only client device 102 is depicted in FIG. 1 for purposes of simplicity, multiple client devices may be present in other embodiments.

In the example depicted in FIG. 1, the client device 102 and the server system 122 are communicatively coupled to each other via communication network 150. Communication network 150 can be of various different types including but not limited to the Internet, an intranet, a local area network (LAN), a wide area network (WAN), and the like. One or more communication protocols may be used to facilitate communications using communication network 150 including various wired and wireless communication protocols.

In the distributed embodiment depicted in FIG. 1, a user can build an application by designing an user interface for the application using client device 102. As the user build the application user interface, changes made by the user may results a change to the view structure of the application. Changes to the view structure of the application may in turn trigger changes to the data model for the application. Information (e.g., metadata) indicative of the changes to the view and data models for the application are then propagated to the server system from the client device. At the server system, the changes may result in automatic updates to the data objects for the application. For example, the database schema for a database storing the data objects may be automatically updated to reflect the updates.

A client device 102 can be a desktop computer, a laptop computer, a smartphone, a tablet computer, and/or any other type of client device. As shown, the client device 102 may be configured to provide an application builder tool 142 that enables a user of client device 102 to build and edit one or more applications according to the teachings of the present disclosure. An example of such a tool is provided as part of the Oracle Application Builder Cloud Service (ABCS) provided by Oracle® Corporation. ABCS is a cloud offering (offered as a Software as a Service (SaaS)) which enables business users to rapidly create and host web applications without writing code and with no programming experience. Users can assemble an application using a collection of built-in user-interface controls, and bind the UI to existing REST services or custom business objects they create from within the tool. ABCS empowers business users to develop customized application solutions without relying on busy IT professionals. The client device 102 may include one or processors and memory resources. In the example depicted in FIG. 1, the memory resources include a memory repository 110 that may be configured to store data related to applications that can be built and/or edited using application builder tool 142.

In the embodiment depicted in FIG. 1, application builder tool 142 comprises multiple modules including an application builder graphical user interface (application builder GUI) module 104, a metadata handler module 106, a client synchronizer module 108 and/or any other components. These modules may be implemented in software (e.g., code, instructions, programs executable by one or more processors of client device 102) or hardware, or combinations thereof. The application builder graphical user interface 104 provides an interface that enables a user of client device 142 to interact with application builder tool 142. The application builder graphical user interface 104 may provide various UI components that a user can select for building an application. Examples of such UI components can include components corresponding to a list, a graph, a media element (e.g., a picture or movie clip), a link, a calendar, an input box, a dropdown menu, a footer, a header, a description box, a text box or area, a window, a button, a table, and other UI components. Application builder GUI 104 may provide an area, for example, a canvas area, where the user can put together one or more selected UI components to build a user interface for an application and create the application.

Figure 2:
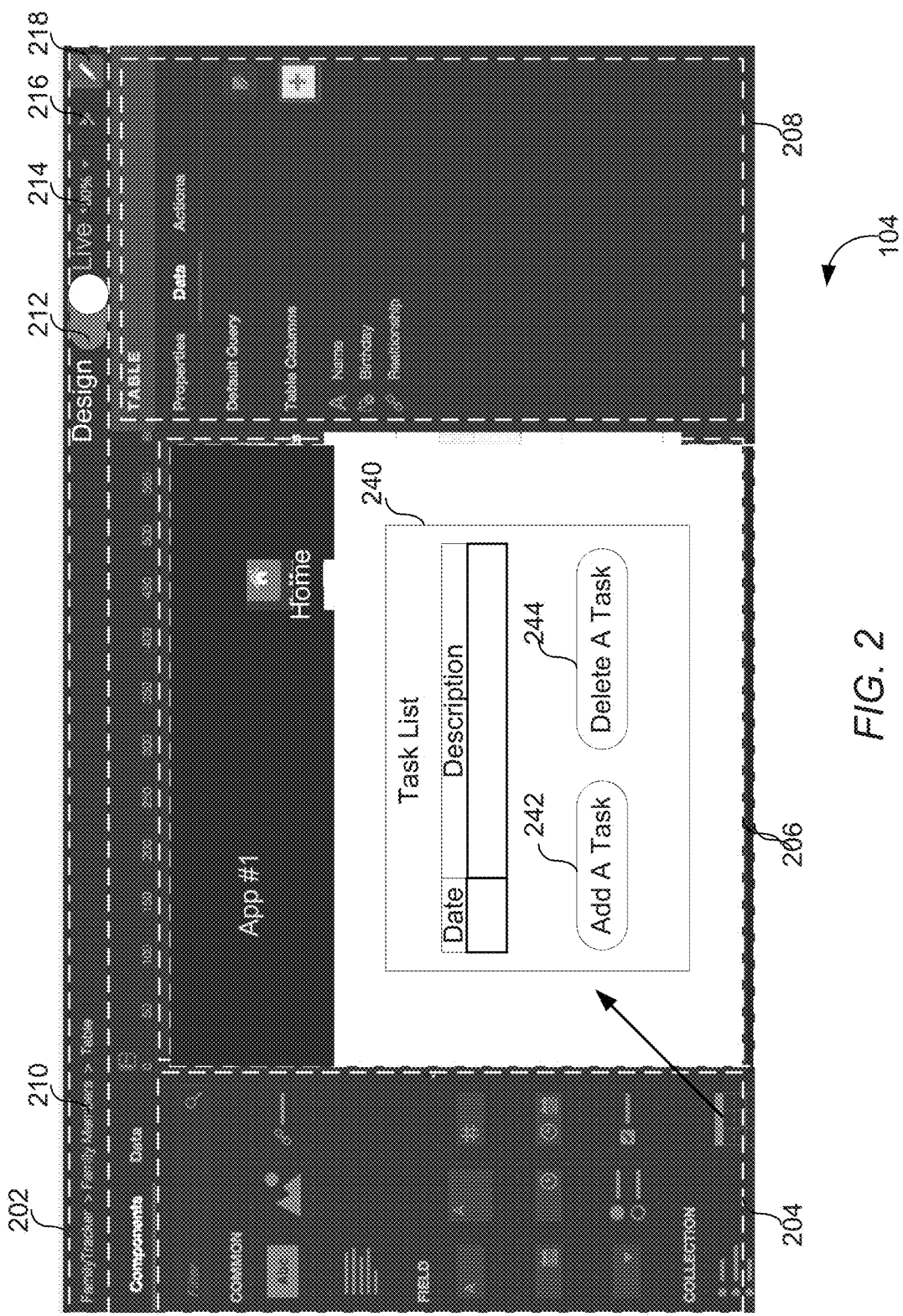
FIG. 2 shows an example of an application builder GUI in accordance with the disclosure.

FIG. 2 shows an example of an application builder GUI 200 that may be displayed by the client computing device 102. In one embodiment, the application builder GUI 200 is implemented through a web browser on the client device 102. In the example depicted in FIG. 2, the application builder GUI 200 comprises a toolbar 202, a palette area 204 displaying multiple user-selectable UI components, a canvas 206 for building the UI for an application, a property inspection panel 208 and/or any other components. Application builder GUI 200 enables a user to build an application simply by building a user interface for the application using one or more UI components provided by application builder GUI 200.

As shown in the example in FIG. 2, the UI components may be organized according to their types such as "Common," "Field," "Collection," and the like. Various other types may be provided in alternative embodiments. A user may build a user interface for an application by selecting a UI component from palette area 204 and then adding it to the UI for the application being built by dragging and dropping the selected UI component into canvas area 206.

Various different types of UI components may be made available in application builder UI 200 by application builder tool 142 such as, without limitation, layout components, media components, custom components, and/or any other types of components. Layout components may include containers for organizing other UI components on canvas 206. Examples of layout components can include tabs, panels, and/or any other types of layout components. Media components can be used to add images to the UI being designed in canvas 206. When the user drags and drops a media component onto canvas 206, the user may be prompted to select a location where the actual media file can be found.

Canvas 206 provides an area where the user can design the user interface for an application being built. In some implementations, canvas 206 may include a pre-defined layout grid of columns and rows to facilitate aligning of GUI components when the user positions them on canvas 206. In certain embodiments, when the user drags and drops a UI component onto the canvas 206, one or more of the existing UI components on canvas 206 may be resized to accommodate the newly added UI component.

In certain embodiments, area 208 is used for displaying information regarding a selected UI component. For example, when a UI component is selected in palette area 204, information regarding the selected component may be displayed in area 208. As another example, when a UI component is selected in the canvas area 206, information regarding the selected component may be displayed in area 208.

Application builder tool 142 enables a user to build a fully functioning executable application by simply building the UI for the application and without having to worry about the data model for the application or about the data objects that are needed for making the application functional and executable. For example, a user may select, from palette area 204, a UI component to be included in the UI for the application being built, and then drag the selected UI component from palette area 204 and drop it into canvas 206. The user may reposition the UI component within canvas 206 if needed. Additional UI components may be selected and added to the canvas area 206 as desired by the user. As the user adds UI components to the application's UI, the data model associated with the application is automatically created and/or updated, which in turn causes the data objects for the application to be automatically created and/or updated and to be wired or bound to the UI components, as explained below in further detail.

In the example depicted in FIG. 2, the user has added a table UI component 240 to the canvas 206 for an application being built. The user has titled the table component "Task List." The table component 240 has two columns, which have been labeled "Date" and "Description" by the user. Additionally, two button components, 242 and 244, have been added to the table component 240. The button component 242 has been labeled "Add A Task" and the function associated with the component is adding a record to the task list The button component 244 has been labeled "Delete A Task" and the function associated with the component is deleting a record from the task list. Both the buttons 242 and 244 can be dragged and dropped to canvas 206 from the palette area 204. Once dropped inside table component 240, the functions associated with the buttons 242 and 244 described above are added because the two buttons have a relationship with the table component 240—i.e., inside the table component 240. As explained below in detail, the data model for the application is created and/or updated as the user adds components 240, 242, and 244 to the application's UI. The data objects for the application are also created based upon the UI components in the UI for the application. For example, in response to addition of table component 240 to the application's UI, a table data object having a particular schema (e.g., two columns) is automatically created in a database at the back end by modifying the database schema for the database and newly created document is bound to the UI components in the canvas.

Referring back to FIG. 1, information related to the application being built may be stored in a memory repository 110 of client device 102 as application information 112. Information for one or more applications may be stored. The application information 112 for an application may include application metadata 114 and other application data 120 The application metadata 114 for an application may include view model information 117, information 116 for a data model for the application, and mapping information 118 mapping components from the view model to data objects in the data model.

Figure 3:
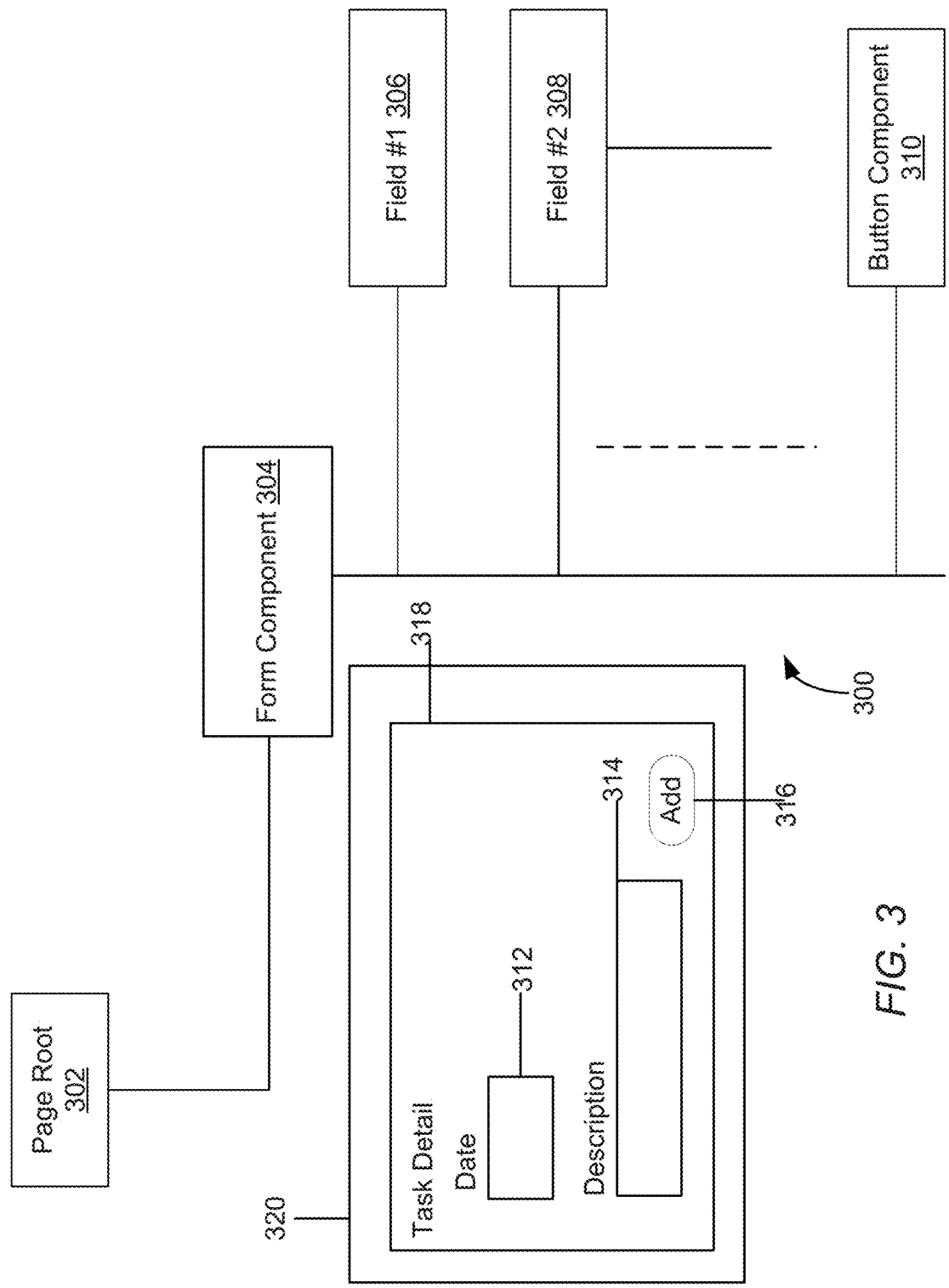
FIG. 3 shows an example of an exemplary view structure for the application shown in FIG. 2 according to certain embodiments.

In certain embodiments, the view model information 117 may include a view structure of the application identifying the various UI components that are part of the application view and relationship between the UI components. In certain embodiments, an application may have a tree-like view structure rooted at a root component with a hierarchical relationship between the UI components included in the application's user interface. The view structure may be updated as changes are made to the application's user interface by the user. An example of the view structure is illustrated in FIG. 3.

Figure 9:
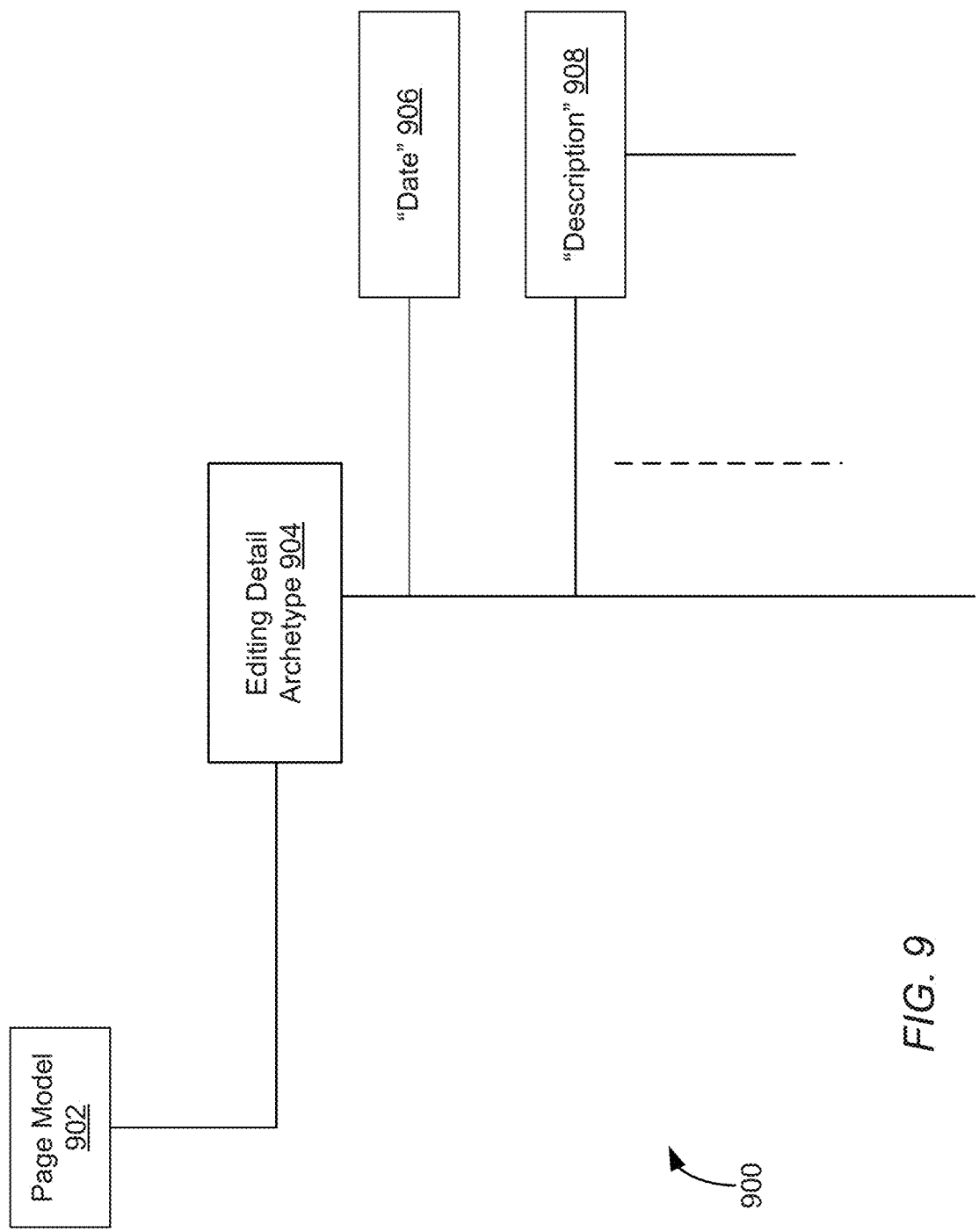
FIG. 9 illustrates an example of a page view-model model that can be generated from the view structure shown in FIG. 3.

In certain embodiments, the view structure of the application as described above can be modeled to create an application view mode. The application view model can be included in the application metadata and stored on the backend server. An example of the application view model is illustrated in FIG. 9.

As previously indicated, the data model information 116 for an application identifies the organization of data for the application. The data model may identify the data objects to be created for the application. A data model for an application can be implemented as a repository for querying or manipulating a structure of business objects or entities. In certain implementations, a given data model may include one or more objects or entities that are associated with UI components in the application. For example, when the user drags and drops a table UI component 240 to the canvas 206 and names it "Task List" as shown in FIG. 2, information indicative of a data object called "Task List" may be automatically added to the data model for the application. The data model information may subsequently be used to actually create the data object. The data objects included in the data model for an application may be automatically determined from the UI components included in the view structure of the application and the hierarchical relationships between the UI components that are also reflected in the view model.

In certain embodiments, mapping information 118 includes information identifying mappings between the UI components in the view model for the application and the data objects identified in the data model for the application. The mapping information 118 is used to automatically and dynamically create bindings between the UI components for the application and the data objects for the application.

In certain embodiments, the application building platform depicted in FIG. 1 may create applications in accordance with the Model-View-ViewModel architecture paradigm. MVVM facilitates a separation of development of the graphical user interface from development of the business logic or back-end logic (the data model). The view model of MVVM is responsible for exposing (converting) the data objects from the model in such a way that objects are easily managed and presented. The view model is used to handle most if not all of the application's view display logic.

In certain embodiments, an application can comprise one or more pages. A page of the application can include one or more UI component. A page view model can be created to represent a view structure (e.g., a tree structure) in accordance with visual relationships of the UI component. The view structure can comprise view elements representing the UI components. The view elements in the view structure can be mapped to corresponding view elements in a page view model, which may be referred to as archetypes. The view structure can be used to generate a template for the page, for example a document object model (DOM) for the page that can be used to render the page. An example of view structure of a page of the application is illustrated in FIG. 3. In some embodiments, the page view model can be implemented as JavaScript objects having various properties and methods. In those embodiments, the properties and methods of the JavaScript objects can be mapped to UI components of the page. The aforementioned page view-model may be described using a model for the page view-model, which may be referred to as the page view-model model. An example of the page view-model model is illustrated in FIG. 9. The archetypes in the page view model can be mapped to corresponding business objects or data models. The various models described above can be stored in the application metadata and can be serialized to the server system as JSON files.

In certain embodiments, mapping information can be generated to map a UI component in the page to a corresponding data model object. A change in the page (e.g., due to a user adding a UI component to the page view) can trigger updates for the application metadata, which may include updating the page view model, page view-model model, the data model, and the mapping information of the page on the client side. The changes to the application metadata on the client may then be propagated to the server side to trigger updates to data objects for the application. For example, if the data objects are implemented and stored in a database schema on the server side, the changes are propagated to the server and the database schema is changed on the server side to update the data objects.

FIG. 3 shows an example of an exemplary view structure 300 for a page 320 of the application shown in FIG. 2. In this example, the page 320 is a form 318 that can be presented when the user click on the "Add A Task" button 242 in the application shown in FIG. 2. Page 320 may be automatically created by the application builder tool when the user adds columns "Date" and "Description" to the table 240. As shown, the page 320 has a field component 312 that allows the user to enter a date for a task to be created, and a field component 314 that allows the user to enter a description of the task to be created. The page 320 may also have a "add" button to allow the user to request the task record as entered by the user to be created in the database on the server system. As shown, a the view structure 300 can be generated to represent relationships of various components in page 320. In this example, page 320 is organized like as a tree-like structure. This is however not intended to be limiting. In other embodiments, the view structure 300 may have a structure different from a tree, such as a graph. In the example depicted in FIG. 3, the view structure 300 is rooted at a root element 302, which can be a frame for the page 310. The root element 302 is connected with a view element 304 which represents the form 316. View element 304 is a child of root element 302. The view element 304 is located at a first level of the view structure 300.

As shown in FIG. 3, the view element 304 has several child elements including view elements 306 and 308, corresponding to the field component 312 and field component 314, respectively. View structure 300 thus indicates the view structure and visual relationships between the UI element 304, 306, and 308. A shown, the view structure 300 also has a view element 310 corresponding to the button component 316.

In implementations, when a change is made to the application UI through the application builder GUI 104, application builder tool 142 is configured to update the view structure 300 by modifying the metadata 114. For example, when the application is first created, the view structure 300 for the application may only include root element 302. After the table UI component 240 is added to the canvas 206, the view structure 300 may be updated to add the view element 304 to the root element 302. Subsequently, when the field components 312 and 314 are added to form 316, view elements 306 and 308 may be added to the view structure 300. In certain embodiments, metadata handler module 106 of application builder tool 142 may be configured to handle processing related to updating the view model and structure for an application and the associated application metadata.

FIG. 9 illustrates an example of a page view-model model 900 that can be generated from the view structure shown in FIG. 3. It will be described with reference to FIG. 3. As mentioned above, the page view model 900 can be used to describe and generate a page view model having a view structure shown in FIG. 3. As shown, the page view-model model 900 can have a page model element 902 that corresponds to the root element 302 of the view structure 300. As also shown, the page view-model model 900 can have an "Editing Detail Archetype" 904 that corresponds to view element 304, a "date" element that corresponds to view element 306, and a "description" element that corresponds to view element 308. The correspondence between the elements in the page view-model model 900 and view elements in the view structure 300 as described above can be captured and stored in the mapping information 118.

Figure 10:
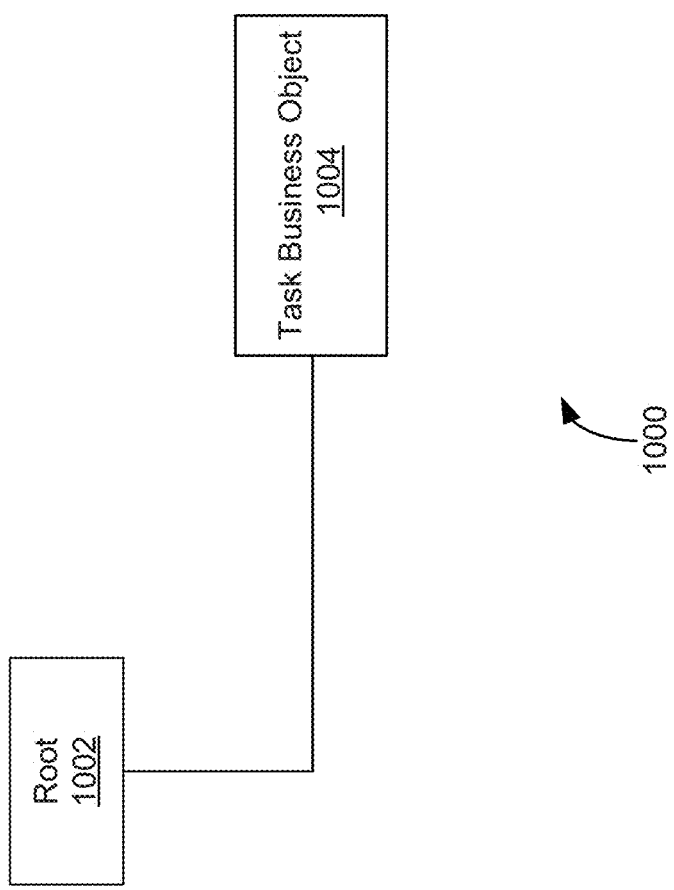
FIG. 10 illustrates an example a data model 1000 that can be mapped to the page view model shown in FIG. 9.

FIG. 10 illustrates an example a data model 1000 that can be mapped to the page view model 900 shown in FIG. 9. It will be described with reference to FIG. 9. As shown, the data model 1000 may have a root 1002, a task business object 1004 connected with the root 1002, and any other business objects (if any). The task business object 1004 can be mapped to the "Editing Detail Archetype" 904 in the page view model 900. The task data model 1004 can be used to represent business operations and logics for a task record that can be entered through page 320.

Figure 4:
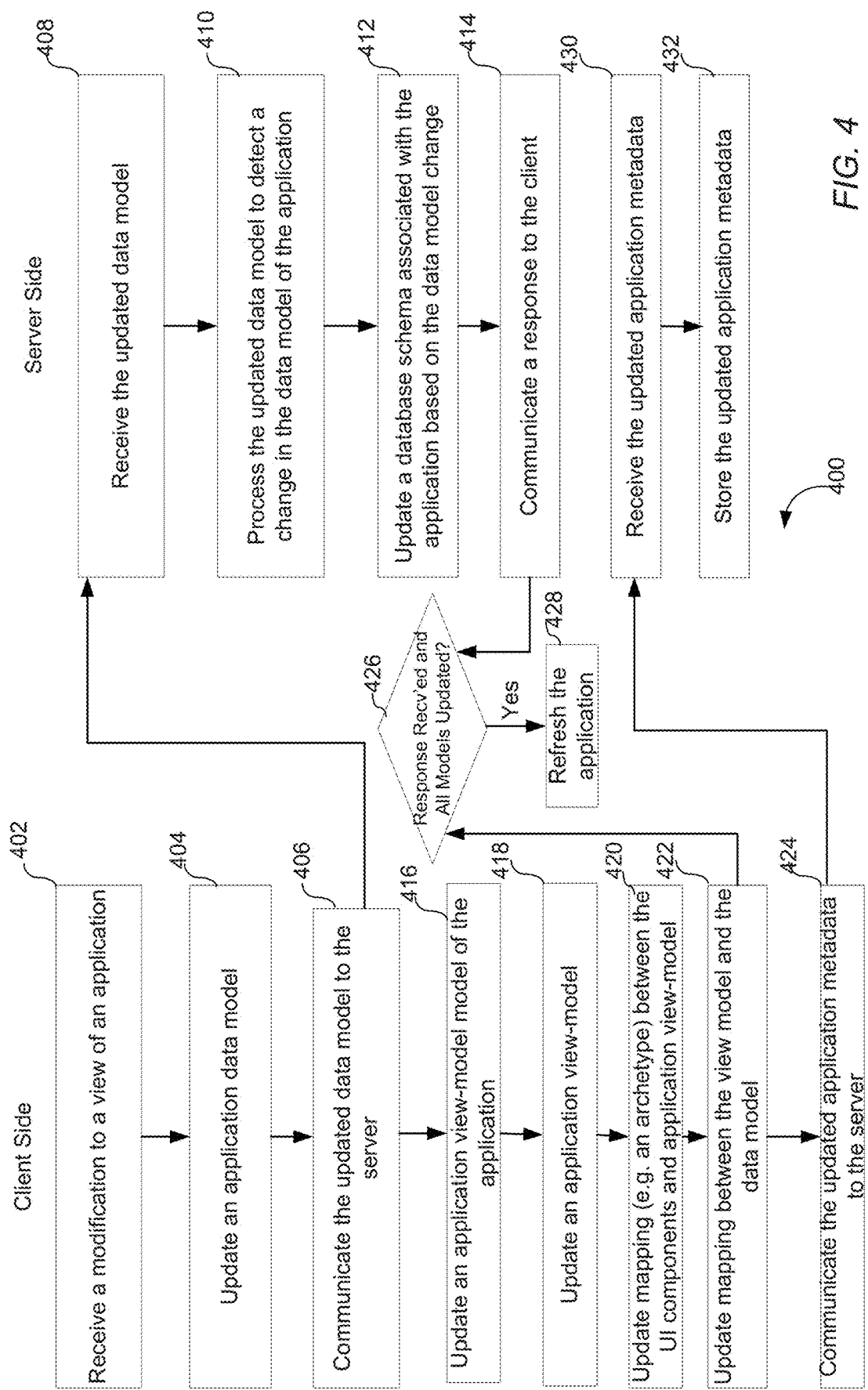
FIG. 4 illustrates a simplified high level flowchart 400 illustrating an exemplary method for facilitating a user to build an application in accordance with certain embodiments.

The various components and modules depicted in FIG. 1 and the processing performed by the components and modules is explained in conjunction with flowchart 400 depicted in FIG. 4.

FIG. 4 illustrates a simplified high level flowchart 400 illustrating an exemplary method for facilitating a user to build an application in accordance with certain embodiments. The method presented in FIG. 4 and described below is intended to be illustrative and non-limiting. The particular series of processing steps depicted in FIG. 4 is not intended to be limiting. It is appreciated that the processing steps may be performed in an order different from that depicted in FIG. 4, and that not all the steps depicted in FIG. 4 need be performed.

In some embodiments, the method depicted in flowchart 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of flowchart 400 in response to instructions stored electronically on an electronic storage medium. The one or more processing devices may include one or more devices configured through hardware, firmware, and/or software to be specifically designed for execution of one or more of the operations of flowchart 400.

As described above, a user builds an application simply by building the user interface for the application using one or more UI components provided by the application builder tool. Accordingly, processing is initiated at 402, when a view of an application is modified. Information indicative of the view modification may be received by the application builder tool 142 executing on the client device. In the example depicted in FIG. 1, application builder GUI module 104 of application builder tool 142 is configured to receive information indicating whether a user has made a change to the view of the application.

Various different actions performed by the user may cause a change or modification to the view of the application. For example, the view of the application may be changed when the user adds a new UI component to the user interface for the application. For example, in FIG. 2, when the user selects and drags and drops a table UI component 240 onto canvas area 206, this changes the view of the application. Adding UI button components 242 and 244 also changes the view of the application. Changing an attribute of a UI component that is already part of the user interface for the application may also change the view of the application. For example, assigning labels "Date" and "description" to the columns of table UI component 240 also changes the view of the application. As another example, changing the number of columns of table component 240 may also change the view of the application. As described above, an application can comprise multiples pages. Changing the pages or the relationship between the pages may also cause a change to the view of the application. Additionally, as previously described, a page can comprise one or more UI components, where on component can have a specific relationship with another component on the page. Changing the relationships between components on a page may also cause the view of the application to change.

At 404, an application data model is updated based on the view change received at 402. As described above, the change received at 402 can cause the data model associated with the application to change. The metadata of the application stored on the client device is updated to reflect and store the changes in the data model. As described above, the data model for the application represents a structure of data for the application. For example, when UI table component "Task List" 240 is added to the application, the data model for the application may be changed by adding a business object corresponding to the table component. Further, when columns of the table UI component are changed or labels assigned to the columns (e.g., "Date" and "Description"), a business object "task list" corresponding to the table UI component in the data model may be added the data model to reflect these changes.

In the example depicted in FIG. 1, processing for 404 may be performed by metadata handler 106. Metadata handler 106 may receive information from application builder GUI 104 indicative of a change in the application's view. In response, metadata handler 106 may be configured to determine changes to the view model for the application. Based upon the changes to the view model, the metadata handler 106 maybe further configured to determine changes to the data model for the application. The metadata handler 106 may make changes to the data model for the application by updating metadata 114 stored for the application on the client device for the application. For example, metadata handler 106 may update data model information 116 to reflect changes to the data model for the application.

At 406, the updated data model may be communicated from the client device to a server system, such as from the client device 102 to the server system 122 shown in FIG. 1. Various different techniques may be used for communicating the information. In certain embodiments, the application metadata may be communicated to the server system in a serialized format such as using one or more files. In certain embodiments, the communication-related processing may be handled by synchronizer modules on the client side and on the server side.

For example, in the embodiment depicted in FIG. 1 the communication-related processing in 406 for sending updated data model information from client device 102 to server system 122 may be handled by client-side synchronizer 108. In certain embodiments, the client-side synchronizer 108 may be configured to communicate the updated data model information 116 to the server system 122 via serialized format such as a JavaScript Object Notification (JSON) file. JSON, which is an alternative format to Extensible Markup Language (XML), provides a readable format for structuring data and is commonly used for transmitting data between a server and a web application. In one embodiment, the client-side synchronizer 108 may only send metadata corresponding to the data model to server system 122 via a AJAX call in a serialized format, for example as a JSON file.

At 408, the updated data model is received at the server system 122. For example, in the embodiment depicted in FIG. 1, on the server side, the information from the client may be received and processed by server-side synchronizer module 136. In certain embodiments, the server-side synchronizer module 136 may send an acknowledgment to the client device indicating receipt of the updated data model information.

In certain embodiments upon receiving the information at 408, server-side synchronizer module 136 may be configured to store the received updated data model information in an application store 126 for the particular application. For example, as shown in FIG. 1, the server system 122 may include multiple application stores 124 corresponding to multiple applications being built using application builder tool 142. In one embodiment, the application store for an application may be created when the application is first created by a user on the client device. An application store for a particular application may store application metadata information 128 for the particular application. The application metadata information 128 may include information 129 related to a view structure of the particular application, information 130 related to the data model for the particular application, and other application information. In some implementations, the data model information stored on the server system 122 may be identical or similar to the corresponding data model information stored on the client device 102. Metadata information 128 can include mapping information for that application. As described above, the mapping information can indicate an association between a UI component and a corresponding data model object.

At 410, the application data model received at 408 is processed by the server system 122. The processing at 410, may involve comparing the received data model with the application data model stored in application store on the server system 122, and determine a change of the data model based on the comparison. In certain embodiments, the processing in 412 may be performed by server-side synchronizer 136 and metadata handler 138 depicted in FIG. 1.

At 412, one or more data objects associated with the application may be updated as a result of a change to the data model for the application as detected at 410. Various different data objects may be created and managed for the application such as tables, linked lists, structures, and the like. Depending upon the nature of the update to the data model, one or more new data objects may be created for an application, or alternatively, the attributes of a previously created data object(s) for the app may be changed. For example, if the data objects are implemented as, for example, tables in a database, the data objects maybe created by modifying or updating the database schema for the database. The database schema may also be updated to make changes to previously created data objects. For example, if a column is to be added or deleted from an existing table data object, or the title of a column of a table data object is to be changed, etc., the database schema for the database storing the data objects may be automatically updated to reflect the updates.

In certain embodiments, the data objects may be implemented using one or more databases. For example, the data objects may be implemented as tables in a database. In such embodiments, the processing in 412 may involve updating the database schema, which causes the data objects stored by the database to be updated. For example, addition of a table UI component called "Task List" may cause a new corresponding table data object to be created in a database and the database schema may be updated to reflect this addition. Changes to attributes of the table UI component may then cause changes to be made to the database schema to reflect the changes. For example, when a column is added (or deleted) from the table UI component, or when labels (e.g., "Date," "Description") are assigned to individual columns of the table, the database schema on the server may be updated to reflect the changes.

In the example depicted in FIG. 1, the processing in 412 may be performed by data objects and schema handler component module 140 depicted in FIG. 1. The data objects 132 for an application may be stored in a database 130. A schema 134 for the database may also be stored. The database 130 can include multiple data objects, such as data objects 132-1 to 132-N as shown, for the application.

In the example depicted in FIG. 1, the data objects and schema handler 140 may be configured to detect a change in a data model associated with a particular application based on the information received from a client device, such as the client device 102. For example, after receiving information indicating that a new business object has been added to the data model for the application due to the addition of table UI component "Table List" to the application's user interface, the data objects and schema handler 140 may be configured to detect this change and create and/or update data objects for the application. For data objects implemented using a database, the data objects may be created and/or updated by changing the database schema. As another example, if the number of columns in the table UI component is changed, the data objects and schema handler 140 may be configured to change the database schema 134 to add or delete columns of the table data object.

At 414, a response may be communicated to the client device 102 by the server system 122. The response communicated at 414 can indicate that the server system has processed the data model.

At 416, an application view-mode model can be updated based on the change received at 402. An example of an application view-model model is illustrated in FIG. 9. As described above, the application view-model model can be used to generate an application view-model, an example of which is illustrated in FIG. 3. Elements in the application view-model model can be mapped to respective view elements in the view structure.

At 418, a view model of the application can be updated at client device 102 based on the application view-model model updated at 416. As described above, the view model of the application can represent a view structure of the application indicating visual relationships of UI components of the application. An example of such a view structure is illustrated in FIG. 3. The update of the application view-model model can trigger the update of the application view model at 418. Using the example depicted in FIG. 2, after the user adds the table component "Task List" 240 to the view of the application and the application view-model model is updated accordingly, the view model of the application can be updated to indicate addition of the table component 240.

At 420, mapping between the application view model and UI components in the application may be updated. As described above, such mapping may be referred to as an "archetype" of the application. For example, after the "task list" view element is added to the application view model, mapping between the "task list" view element and "task list" UI component can be established as an archetype "enter task list detail" archetype.

At 422, the mapping information stored on the client for the application may be updated responsive to the changes to the view structure, view model and data model of the application. As described above, the mapping information provides mappings or associations between the UI components in the view of the application and the data objects in the data model may for the application. For example, the archetype "enter task list detail" archetype can be mapped to the "task list" business object in the data model for the application.

In the example depicted in FIG. 1, the processing in 422 may be performed by metadata handler 106. Using the example depicted in in FIG. 2, responsive to a change in the view model for the application resulting from adding table UI component "Task List" to the application's user interface, the data model for the application is also updated by adding a business object "task list" to the data model. Metadata handler 106 may be configured to update the mapping information 118 to create an association between the "Task List" business object and the "ether Task List" archetype. As will be described herein, the mapping information 118 can be used by the application builder tool 142 to fetch data from server system 122 to populate table 240 when the application 240 is refreshed.

At 424, the updated application metadata, including the updated view structure, application view model, application data model, and the mapping information, can be communicate from the client device 102 to the server system 122 in serialized formats, such as JSON files.

At a decision 426, a determination is made whether a response is received from the server system 122 indicating the server system 122 has processed the data model change, and whether all models for the application have been updated as triggered by the change received at 402. As can be seen, in the case when it is determined that both conditions have happened, the processing proceeds to 426.

At 426, the application user interface is refreshed and changes made to the view are displayed. In certain embodiments, a change to the view structure causes the application user interface to be updated and refreshed automatically. The updated metadata information and the updated mapping information may be used to refresh the application user interface. As mentioned above, the application may comprise 1-N pages, which can be comprise DOM elements. The DOM for a particular page can be constructed from a page view model. The processing in 426 may involve generating a DOM for the page, such as html, based on the updated view structure described by the metadata information. In some implementations, the processing in 426 may involve fetching data from the server system to the view based on the updated mapping information. The archetype elements in the page view model as described above can be used to fetch data from the server system 122. In some embodiments, a binding technology such as Knockout® can be used to bind a page template to the page view model. Using the "task list" example above, after a DOM tree is generated, actual data may be fetched from the "task list" table (assuming "task list" is a pre-existing table in the server system and the user adds the table component 240 to link with this pre-existing table); and may be populated in the DOM tree for display in the application.

In the example depicted in FIG. 1, the application development platform is distributed with processing performed by a client device and a server system. In such a configuration, the application building capability described by this disclosure may be provided as a cloud service by the server system of a cloud services provider. A user may register with a server system of the cloud service provider and subscribe to the application building cloud service. After the user has subscribed to the service (and possibly after payment for the service), a client-side component such as the application builder tool 142 may be downloaded to the client's device. The user may then use the application builder tool 142 on the client to design the user interface for an application as described above. The server system provides the back-end repository for storing data objects for the application and may also store the user data associated with the application.

At 432, the updated application metadata communicated from the client device 102 at 424 can be received by the server system 122.

At 432, the updated application metadata can be stored in an appropriate application data store 126. In certain embodiments, a client device 102 may request application metatadat for a particular application from the server system 122. For example, the client device 102 may initiate a request to reconstruct a view of a particular application. Upon receiving such a request, the metadata handler 138 on the server system 122 may be configured to retrieve appropriate application metadata for the particular application and send it to the client device 102. The client device 102 may then use the application metadata received from the server to construct the particular application.

The distributed cloud-based environment described above is just one way of implementing the features described in this disclosure and is not intended to be limiting. In certain embodiments, a single system may be provided instead of a client-server system. The single system may be configured to perform processing described above that was described in the client-server context. For example, the single system may execute an application builder tool that enables a user to develop an application by simply building a user interface for the application. The application builder tool executing on the single system is also configured to automatically generate the data objects for the application, as described above. For example, if the data objects are stored in a database, the application builder tool may be configured to automatically update the database schema to add or change the data objects for the application.

Specific Use Case Example (Not Meant to be Limiting)

The following example describes a specific simplified use case for illustrating how a non-technical user may use the application builder infrastructure described above to create an application. This example is however not intended to limit the scope of embodiments recited in the claims.

The user for this use case is assumed to be a forgetful woodcutter "Pete" who wants to make his life easier and find a way to stop forgetting the tasks he has to perform. He decides to use an embodiment of the application builder platform described above to build an application. Pete may subscribe to the application builder services provided by a cloud provider and have an application builder tool downloaded to his client device. Pete then opens the application builder tool in a web browser on his client device and starts creating a new application. These actions by Pete may cause the following to occur.

At the Backend Server:
   A new application domain model is created.
   A new application metadata Database schema is created.
   A new application storage (file system like REST service for serving resources) is created, and all necessary resources identified by a "new application template" are allocated.
   A new empty database schema is created for the application.

At Client-Side:
   The data-model structure descriptor (a JSON file) for storing the data model for the application is created. Then, descriptors for all the application pages are loaded.
   The application home page is activated:
      The page definitions are loaded from the corresponding application metadata (e.g., a JSON file) from the storage.
      A tree-like view structure of elements describing the page components is made from the application metadata.
      Each view element can represent an instance of a UI component (e.g. button, table). This may be empty if there no UI components in the user interface for the application as yet.
      A page view is dynamically created by traversing the tree of view elements in a recursive manner.
         Each UI component type can have its own "generator," which is a piece of code which is responsible for generating a piece of DOM, which represents the component.
         The generator reads the metadata in the view object and shapes the DOM element accordingly.
      The page is made "alive" by applying the bindings, for example Knockout® can be used.

Pete may see an empty "home" page or canvas area. Peter then desires to add a list or table to his application to store list his upcoming tasks. So he selects a table UI component from the palette of the application builder tool and then drags and drops it on to the empty home page or canvas area. This may cause a wizard associated with the table UI component to open. Pete may then enter a name "Task List" for the table component using the wizard. The actions by Pet may cause the following to occur:

At Client Device:
   The data model for the application is modified by adding a new data object "Task List" to the data model. This is done by updating the metadata for the application.
   Upon the data-model change, the data-model information is "serialized" and a corresponding application metadata (e.g., a JSON file) is communicated from the client device to the backend server (e.g., via a storage service).

At the Server System:
   The application metadata is received and a change in the data-model of the application is detected by comparing the current data-model structure information stored by the server with the modified data-model structure information received from the client. The application metadata on the server is then updated to synchronize with the metadata information received from the client.
   The database schema for the application is changed accordingly. For example, a new table data object is added to the database storing data objects for the application.

At the Client Device:
   The page metadata for the application is updated to add a new view of table type.
      The code responsible for the application models shaping and UI rendering grabs this event and does:
         Refreshes the page view—adds a new table view instance.
         Refreshes the page DOM tree—the generator for table component takes the view metadata and creates a piece of DOM tree which represents the table UI and then adds it to the page DOM.

Knockout bindings are applied that bind the view model and UI components to the data model.

At this point the page already contains a living table UI which shows some mock data.

Pete may then add new fields such as "Date" and "Description" to the columns of the table UI component. This causes:

At Client Device:

New properties (e.g., names of columns) are added to the "Task List" data object in the data-model.

The table view is modified to the table shows the new columns.

The application page user interface is refreshed showing the table now with two columns labeled "Date" and "Description."

Pete then closes the wizard. This causes:

At Client Device:

A set of application pages "Create/Show/Edit task" to be created. The pages by default contain forms which show the attribute fields and "Save" and "Cancel" buttons.

After a while, the changes done to the page and the new pages are "serialized" and stored to the corresponding resources in the application storage.

Next, Pete sees a table with some sample and a "Create" button above. He clicks "create".

At Client Device:

The formerly created "Create Task" application page is rendered. A new page named "Create Task" opens and Pete sees an input field with "Description" label. Pete fills "To cut the forest in the backyard" and clicks "Save and Close".

A POST data http request is made to the corresponding data user service via REST calls.

The home page of the application is activated.

Pete then gets back to the application home page, i.e., the page containing the table UI component for the task he has just added. He then clicks on the task and opens the detail form. He then realizes he wants to mark a task as completed. He decides to add a checkbox to his application to record that he has completed the task. In order to do this, he selects the checkbox object from the palette and drags and drops it to the task edit detail form. In the dialog that opens, he names the label "Completed" and closes the dialog. This causes:

At Client Device:

A new property "Completed" of Boolean type is added to the attribute "Task" in the data-model.

The change is sent to the backend server which then alters the database schema.

New view of "Checkbox" type is added to the corresponding part of the page views tree.

The view bindings metadata are set so the Checkbox value binds to newly added observable in the "attribute form view model".

The page is regenerated to reflect the changes.

Pete may then check the task as completed and click "Save and Close". The table on the homepage contains a column which shows the tasks that are completed. Pete adds a new task "Grind the axe". After a while he remembers he recently heard about a great grinder and wants to add that to the task. He also wants to add more notes to one task. So he drops another table to the task detail form and a table wizard opens. He adds a new business object "note." This causes:

At Client Device:

New attribute "note" to be created in the data-model.

Since Pete dropped the component on to another component, which represents an attribute form, it is inferred that Pete wants to have these connected to data.

So a new relation 1:N is created between the task and note attribute.

Then the views are modified in the same way as in the previous cases.

Pete may then add a text field named "Content" and then close the wizard. His task detail form now has an embedded table with another "Create" button. He clicks it and in the resultant "Create Note" form he fills "Ask Paul the grinder" and clicks "Save and Close". He is now able to attach notes to any of his tasks as desired.

In the use case described above, Pete is able to build a fully functioning application simply by interacting with UI components provided by the application builder tool and without having to perform any coding or programming. The data objects for the application are automatically taken care of by the application builder tool. Further, the application being built by Pete executes like a like running application while Pete is designing the application. Accordingly, changes made by Pete to the application's user interface are reflected by in the application as if the application is executing in live execution mode. Further, Pete can add data to the application while designing the application. The user-provided data is automatically stored in the appropriate data objects generated by the application builder tool without Pete having to know anything about the data objects themselves (or about database schemas if the data objects are implemented in a database).

Figure 5:
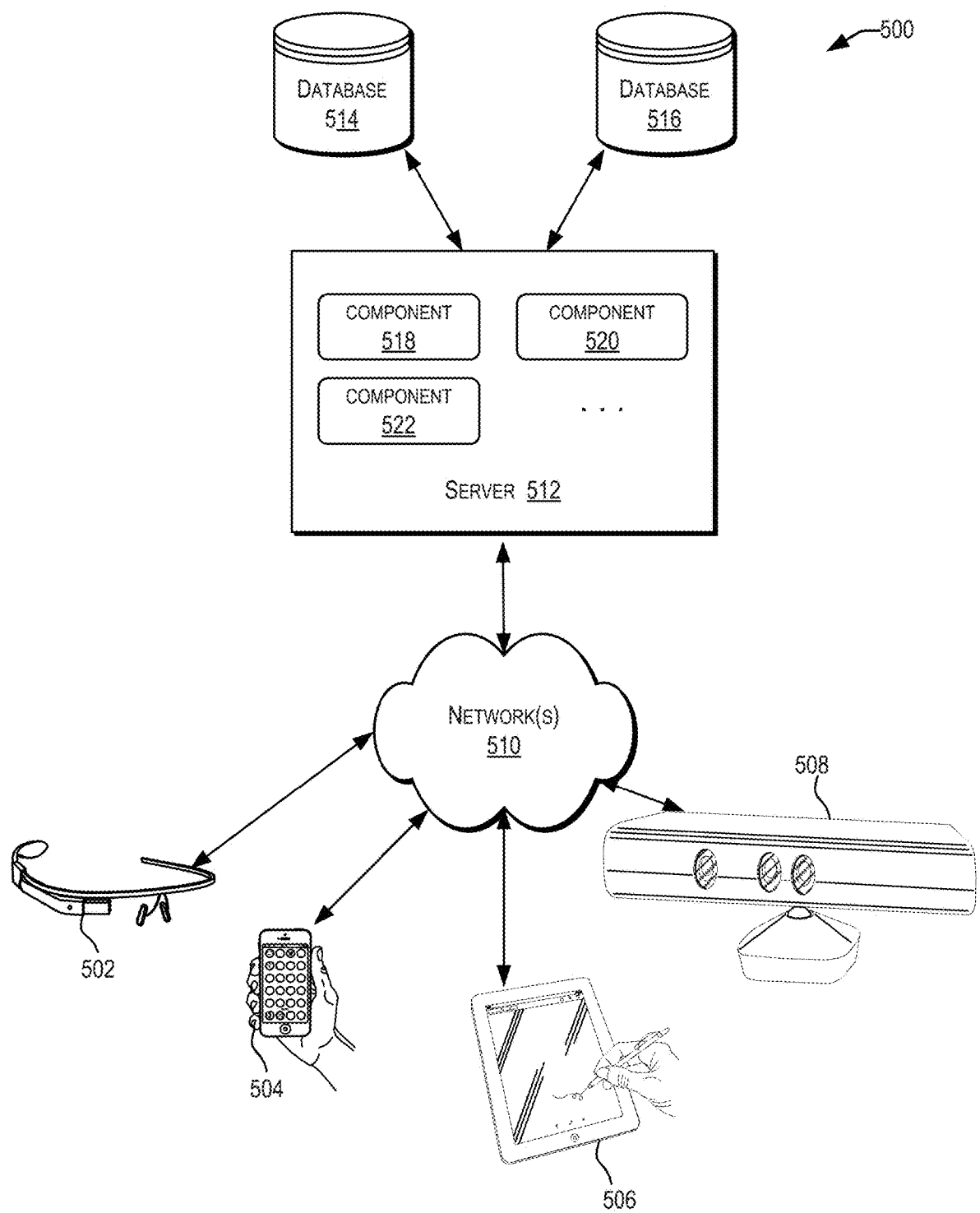
FIG. 5 illustrates an exemplary computer system that may be used to implement certain embodiments.

FIG. 5 depicts a simplified diagram of a distributed system 500 for implementing an inventive embodiment. In the illustrated embodiment, distributed system 500 includes one or more client computing devices 502, 504, 506, and 508, which are configured to execute and operate client applications such as a web browser, proprietary client (e.g., Oracle Forms), or the like over one or more network(s) 510. Server 512 may be communicatively coupled with remote client computing devices 502, 504, 506, and 508 via network 510.

In various embodiments, server 512 may be adapted to run one or more services or software applications such as services and applications that provide the digital document (e.g., webpage) analysis and modification-related processing described above. In certain embodiments, server 512 may also provide other services or software applications that can include non-virtual and virtual environments. In some embodiments, these services may be offered as web-based or cloud services, such as under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, server 512 may provide the functionality for generating a combined query that selects data from multiple sources. The functionality may be provided by software components 518, 520 and 522 implemented on server 512. In certain embodiments, client computing devices 502, 504, 506, and/or 508 may also implement one or more components that facilitate the interactions analysis and digital document modification functionality. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, and/or 508 to request digital documents (e.g., to request webpages). The documents received by a client in response to the document request may then be output to the user of the device via an interface of the client device. Although FIG. 5 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone, Android™, BlackBerry® 5, Palm OS). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device), and the like. The client devices may be capable of executing various different applications such as various Internet-related apps, communication applications (e.g., E-mail applications, short message service (SMS) applications) and may use various communication protocols.

Network(s) 510 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 502.5 suite of protocols, Bluetooth®, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization such as one or more flexible pools of logical storage devices that can be virtualized to maintain virtual storage devices for the server. In various embodiments, server 512 may be adapted to run one or more services or software applications that provide the functionality described in the foregoing disclosure.

The computing systems in server 512 may run one or more operating systems including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more data repositories such as databases 514 and 516. These databases may provide a mechanism for storing information such as user interactions information, usage patterns information, adaptation rules information, and other information used by certain embodiments. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle, that are adapted to store, update, and retrieve data in response to SQL-formatted commands.

In certain embodiments, the document analysis and modification services described above may be offered as services via a cloud environment. FIG. 5 is a simplified block diagram of a cloud-based system environment 500 in which services, such as the dynamic modification of digital documents responsive to usage patterns as described above, may be offered as cloud services, in accordance with an embodiment of the present disclosure. In the illustrated embodiment in FIG. 5, cloud infrastructure system 502 may provide one or more cloud services that may be requested by users using one or more client computing devices 504, 506, and 508. Cloud infrastructure system 502 may comprise one or more computers and/or servers that may include those described above for server 1012. The computers in cloud infrastructure system 502 may be organized as general purpose computers, specialized server computers, server farms, server clusters, or any other appropriate arrangement and/or combination.

Network(s) 510 may facilitate communication and exchange of data between clients 504, 506, and 508 and cloud infrastructure system 502. Network(s) 510 may include one or more networks. The networks may be of the same or different types. Network(s) 510 may support one or more communication protocols, including wired and/or wireless protocols, for facilitating the communications.

The embodiment depicted in FIG. 5 is only one example of a cloud infrastructure system that may incorporate certain embodiments and is not intended to be limiting. It should be appreciated that, in some other embodiments, cloud infrastructure system 502 may have more or fewer components than those depicted in FIG. 5, may combine two or more components, or may have a different configuration or arrangement of components.

Figure 6:
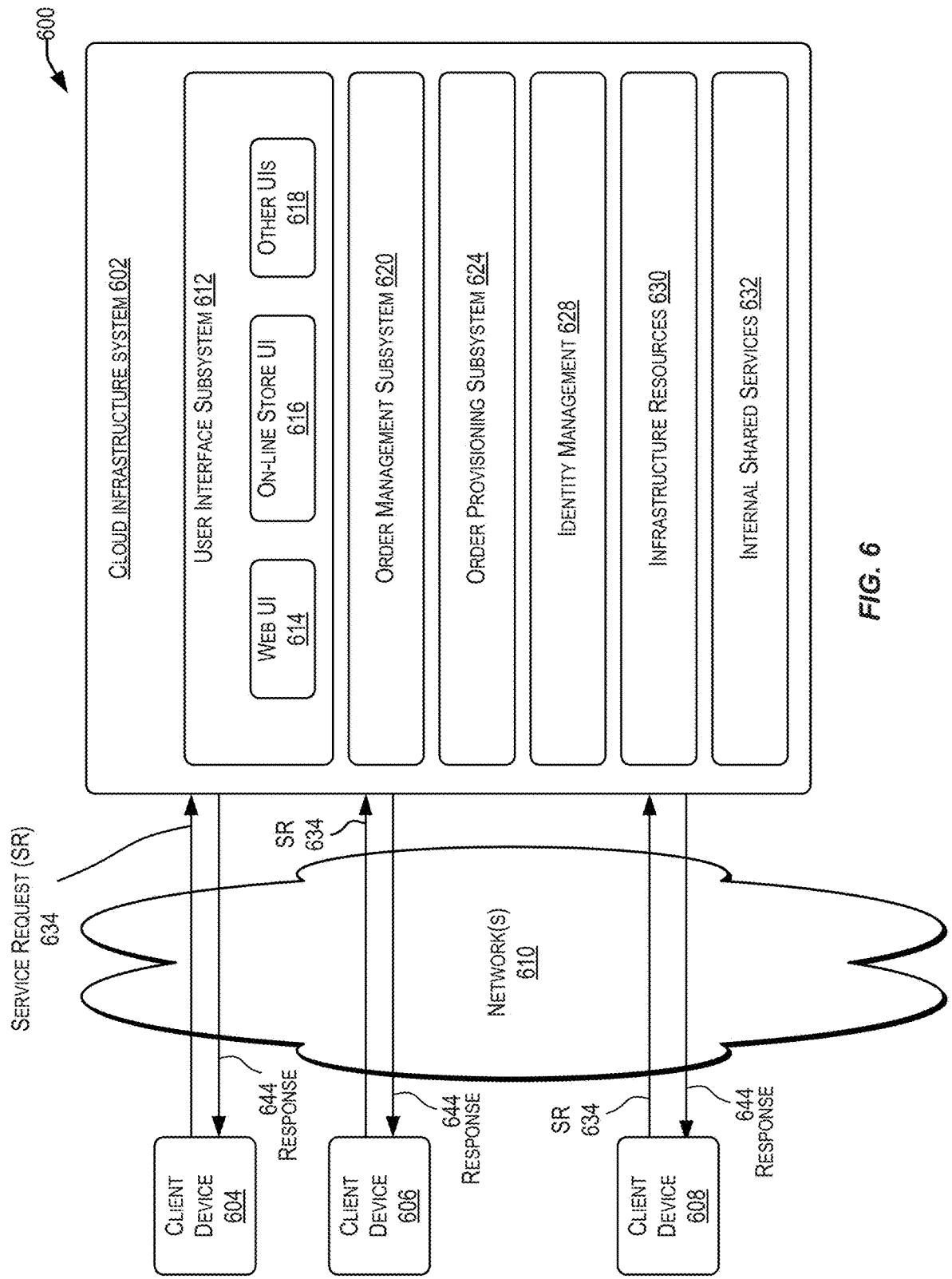
FIG. 6 illustrates still another exemplary system for facilitating the user to build an application in accordance with the disclosure.

In certain embodiments, the document analysis and modification services described above may be offered as services via a cloud environment. FIG. 6 is a simplified block diagram of a cloud-based system environment 600 in which services, such as the dynamic modification of digital documents responsive to usage patterns as described above, may be offered as cloud services, in accordance with an embodiment of the present disclosure. In the illustrated embodiment in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 1012. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system that may incorporate certain embodiments and is not intended to be limiting. It should be appreciated that, in some other embodiments, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative embodiments.

The term "cloud service" is generally used to refer to a service that is made available to users on demand and via a communication network such as the Internet by systems (e.g., cloud infrastructure system 602) of a cloud service provider. Typically, in a public cloud environment, servers and systems that make up the cloud service provider's system are different from the customer's own on-premises servers and systems and are managed by the cloud service provider. This enables customers to acquire cloud services without the need for the customers to purchase separate licenses, support, or hardware and software resources for the services. For example, a cloud service provider's system may host an application, and a user may, via the Internet, on demand, order and use the application. Cloud services are designed to provide easy, scalable access to applications, resources and services. Examples of cloud services provided by Oracle Corporation® of Redwood Shores, Calif., include without limitation, middleware service, database service, Java cloud service, and others.

Cloud infrastructure system 602 may provide one or more cloud services. These services may be provided under various models such as under a Software as a Service (SaaS) model, a Platform as a Service (PaaS) model, an Infrastructure as a Service (IaaS) model, and others including hybrid service models. For example, a SaaS model may be used to provide customers access to on-demand applications that are hosted by cloud infrastructure system 602. SaaS thus enables an application or software to be delivered to a customer over a communication network like the Internet, as a service, without the customer having to buy the hardware or software for the underlying application. The IaaS model is generally used to provide infrastructure resources (e.g., servers, storage, hardware and networking resources) to a customer as a cloud service. The PaaS model is generally used to provide, as a service, platform and environment resources that enable customers to develop, run, and manage applications and services without the customer having to procure, build, or maintain such resources. Examples of services provided under the PaaS model include, without limitation, Oracle Java Cloud Service (JCS) and Oracle Database Cloud Service (DBCS) provided by Oracle Corporation, Redwood Shores, Calif., and others. An example of a cloud infrastructure system is the Oracle Public Cloud provided by Oracle Corporation. Cloud infrastructure system 602 may include a suite of applications, middleware, databases, and other resources that enable provision of the various cloud services.

Cloud services are generally provided on an on demand basis self-service basis, subscription-based, elastically scalable, reliable, highly available, and secure manner. For example, a customer, via a subscription order, may order one or more services provided by cloud infrastructure system 602. Cloud infrastructure system 602 then performs processing to provide the services in the customer's subscription order. For example, a website provider may request cloud infrastructure system to monitor a particular set of users' interactions with webpages provided by that website and provide automated modification capability for these webpages responsive to usage patterns determined based upon the monitored information. In addition to services related to dynamic document modification responsive to usage patterns, cloud infrastructure system 602 may be configured to provide other services.

Cloud infrastructure system 602 may provide the cloud services via different deployment models. In a public cloud model, cloud infrastructure system 602 may be owned by a third party services provider and the cloud services are offered to any general public customer, where the customer can be an individual or an enterprise. In other embodiments, under a private cloud model, cloud infrastructure system 602 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 602 and the services provided may be shared by several organizations in a related community. Various other models such as hybrids of the above mentioned models may also be used.

Client computing devices 604, 606, and 608 may be devices similar to those described above for 1002, 1004, 1006, and 1008 and may be capable of operating one or more client applications such as a web browser and other applications. A user may use a client device to interact with cloud infrastructure system 602 such as to request a service provided by cloud infrastructure system 602 using a client device, provide adaptation rules, etc. Client devices may also be used to request digital documents and to receive modified digital documents according to the teachings of the embodiments of certain embodiments.

In some embodiments, the processing performed by cloud infrastructure system 602 for providing interactions monitoring and dynamic document modification services may involve "big data" analysis. The term "big data" is generally used to refer to extremely large data sets that can be stored, analyzed, and manipulated to detect and visualize various trends, behaviors, relationships, etc. within the data. Big data analysis may involve multiple processors processing the data possibly in parallel, performing simulations using the data, and the like. For example, analysis of the collected user interactions information and deriving usage patterns from the collected data for multiple sets of users and then using the usage patterns to drive modifications of documents may involve "big data" analysis. The data that is collected and analyzed may include structured data (e.g., memory repositoryd in a database or structured according to a structured model) and/or unstructured data (e.g., data blobs (binary large objects)).

As depicted in the embodiment in FIG. 6, cloud infrastructure system 602 may also include infrastructure resources 680 that are utilized for facilitating the provision of cloud services by cloud infrastructure system 602. Infrastructure resources 680 may include, for example, processing resources, storage or memory resources, networking resources, and the like. In certain embodiments, to facilitate efficient provision of these resources for supporting the various cloud services provided by cloud infrastructure system 602 for different customers, the resources may be bundled into resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources from the first set of pods, may be provisioned for Java service, and the like. For some services, the resources allocated for provisioning the services may be shared between the services.

Cloud infrastructure system 602 may itself internally use services 682 that are shared by different components of cloud infrastructure system 602 and which facilitate the provision of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 602 may comprise a user interface subsystem 612 that enables users or customers of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a customer may, using a client device, request (service request 684) one or more services provided by cloud infrastructure system 602 using one or more of interfaces 614, 616, and 618. For example, a customer may access the online store, browse cloud services offered by cloud infrastructure system 602, and place a subscription order for one or more services offered by cloud infrastructure system 602 that the customer wishes to subscribe to. The service request may include information identifying the customer and one or more services that the customer desires to subscribe to. For example, a customer may order the digital document modification service offered by cloud infrastructure system 602.

Cloud infrastructure system 602 may comprise various modules for handling service requests received from customers. These modules may be implemented in hardware or software or combinations thereof. In one embodiment, an order management subsystem (OMS) 620 may be provided that is configured to process the new order. As part of this processing, OMS 620 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Order provisioning subsystem (OPS) 624 may be configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 624 is configured to determine the cloud service being requested and identify a number of pods that may have been pre-configured for that cloud service. The number of pods that are allocated may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 602 may send a response or notification 644 to the requesting customer to indicate that the requested service is now ready for use. In some instances, information (e.g. a link) may be sent to the customer that enables the customer to start using and availing the benefits of the requested services.

Cloud infrastructure system 602 may provide services to multiple customers. For each customer, cloud infrastructure system 602 is responsible for managing information related to one or more subscription orders from the customer, maintaining customer data related to the orders, and providing the requested services to the customer. Cloud infrastructure system 602 may also collect usage statistics regarding a customer's use of subscribed services. For example, statistics may be collected for the amount of storage used, the amount of data transferred, the number of users, and the amount of system up time and system down time, and the like. This usage information may be used to bill the customer. In this manner, cloud infrastructure system 602 may store information, including possibly proprietary information, for multiple customers.

In certain embodiments, cloud infrastructure system 602 comprises an identity management subsystem (IMS) 628 for managing customers information and providing the separation of the managed information such that information related to one customer is not accessible by another customer. IMS 628 may be configured to provide identity services, such as information access management, authentication and authorization services, manage customer identities and roles and related capabilities, and the like.

Figure 7:
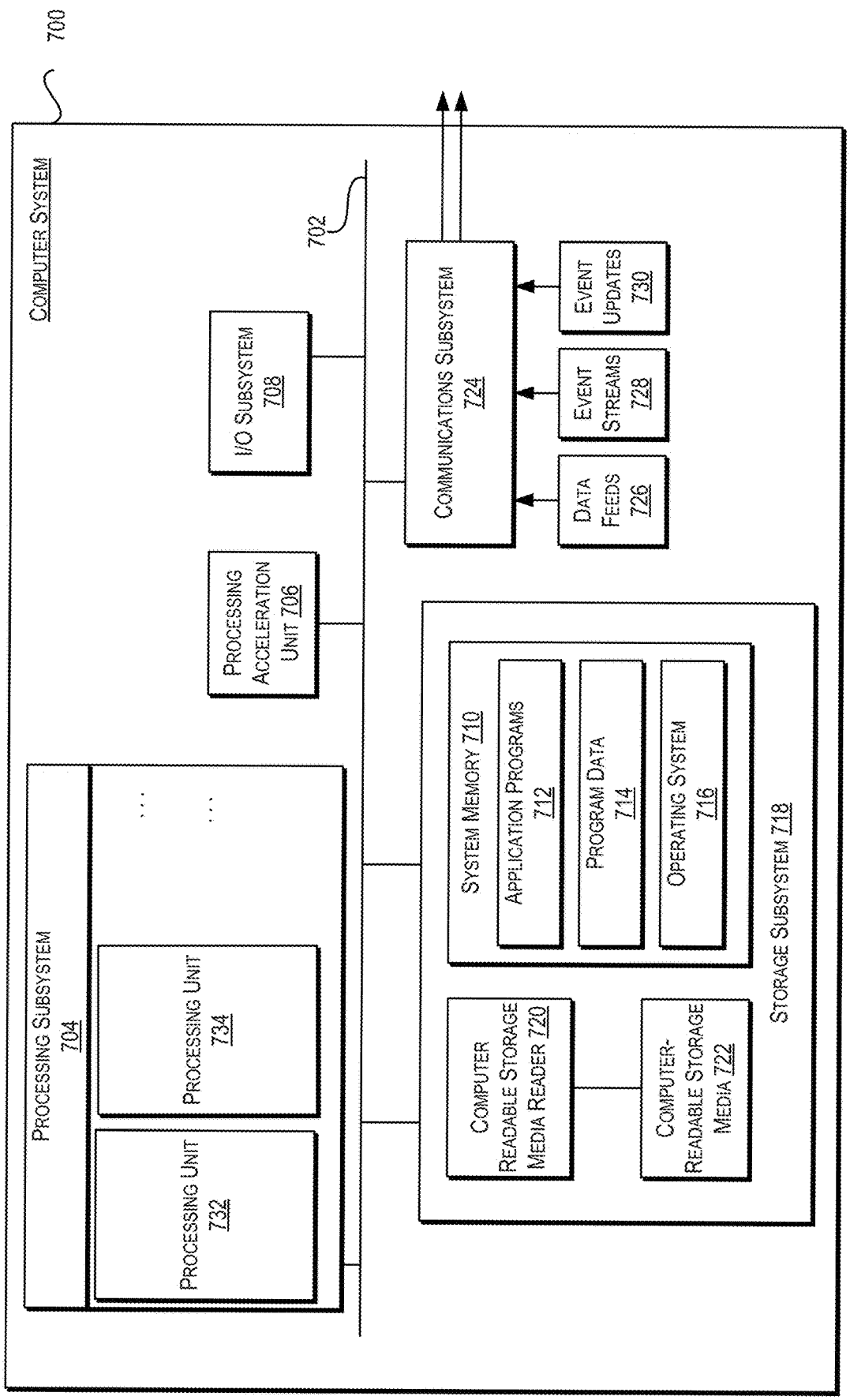
FIG. 7 illustrates yet another exemplary system for facilitating the user to build an application in accordance with the disclosure.

FIG. 7 illustrates an exemplary computer system 700 that may be used to implement certain embodiments. In some embodiments, computer system 700 may be used to implement any of the various servers (e.g., server system 122 in FIG. 1) and computer systems (e.g., client device 102 in FIG. 1) described above. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1886.1 standard, and the like.

Processing subsystem 704 controls the operation of computer system 700 and may comprise one or more processing units 782, 784, etc. A processing unit may include be one or more processors, including single core or multicore processors, one or more cores of processors, or combinations thereof. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above for dynamically modifying documents (e.g., webpages) responsive to usage patterns.

In certain embodiments, a processing acceleration unit 706 may be optionally provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term "input device" is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 860 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (8D) mice, joysticks or pointing sticks, gamepads and graphic tablets, and audio/visual devices such as speakers, digital cameras, digital camcorders, portable media players, webcams, image scanners, fingerprint scanners, barcode reader 8D scanners, 8D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term "output device" is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or memory repository for storing information that is used by computer system 700. Storage subsystem 718 provides a tangible non-transitory computer-readable storage medium for storing the basic programming and data constructs that provide the functionality of some embodiments. Software (programs, code modules, instructions) that when executed by processing subsystem 704 provide the functionality described above may be stored in storage subsystem 718. The software may be executed by one or more processing units of processing subsystem 704. Storage subsystem 718 may also provide a repository for storing data used in accordance with certain embodiments.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM) or dynamic random access memory (DRAM).

By way of example, and not limitation, as depicted in FIG. 7, system memory 710 may store application programs 712, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 722 may store programming and data constructs that provide the functionality of some embodiments. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 722 may provide storage of computer-readable instructions, data structures, program modules, and other data for computer system 700.

In certain embodiments, storage subsystem 718 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for storing computer-readable information.

In certain embodiments, computer system 700 may support virtualization technologies, including but not limited to virtualization of processing and memory resources. For example, computer system 700 may provide support for executing one or more virtual machines. Computer system 700 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 700. Accordingly, multiple operating systems may potentially be run concurrently by computer system 700. Each virtual machine generally runs independently of the other virtual machines.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, adaptive webpages system 102 depicted in FIGS. 1 and 2 may receive user interactions information and webpage requests from client devices using communication subsystem 724. Additionally, communication subsystem 724 may be used to communicate webpages from adaptive webpages system 102 to the requesting clients.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 8G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, in addition to other forms, communications subsystem 724 may receive input communication in the form of structured and/or unstructured data feeds 726, event streams 728, event updates 780, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 780, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 780, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments. Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope. Illustrative methods and systems for providing features of the present disclosure are described above. Some or all of these systems and methods may, but need not, be implemented at least partially by architectures such as those shown in FIGS. 1-12 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed:

1. A computer-implemented method, the method comprising:
   automatically receiving, at a server system, updated application metadata from a client computer for a graphical user interface (GUI) being developed in a view model on the client computer for an application, the application metadata including an updated data model, an updated view model and an updated mapping information, wherein the updated application a first change to the GUI being developed due to addition of a graphical user interface component to a page of the application in the view model on the client computer, wherein the GUI is developed in accordance with a Model-ViewViewModel (MVVM) architecture;
   automatically comparing, by a server-side synchronizer module of the server system, the updated data model with a first data model stored in an application store of the server system;
   determining, by the server-side synchronizer module of the server system, a change to the first data model based on the comparison;
   automatically updating, at the server system during design of the GUI so as to perform a dynamic live update of the first data model, the first data model created for the application based upon the GUI being developed, the updating comprising creating a new data object for the graphical user interface component by updating a database schema created for the application, wherein the new data object created for the graphical user interface component is a table stored in a database;
   automatically binding, by the server system, the new data object to the graphical user interface component so as to bind the view model to the first data model during design of the GUI using the received updating mapping information in the updated application metadata;
   receiving, at the server system from the client computer, metadat information indicative of a second change to the GUI being developed on the client computer, the second change indicating a change to an attribute of the graphical user interface component, wherein the second change is a deletion or an addition of a column to the graphical user interface component;
   responsive to receiving the information indicative of the second change, automatically deleting or adding, at the server system, a column from or to the new data object corresponding to the column deleted or added by the second change by updating the database schema associated with the first data model for the application; and
   while the GUI is being developed on the client computer:
      receiving, at the server system, data entered into the graphical user interface component on the client computer; and
      storing the data in the new data object in the database.

2. The computer-implemented method of claim 1, wherein the graphical user interface component is a graphical table component.

3. The computer-implemented method of claim 1, wherein the application metadata comprises data describing a view structure of the application.

4. The computer-implemented method of claim 1, further comprising refreshing the GUI being developed on the client computer based on the first change.

5. The computer-implemented method of claim 1, further comprising refreshing the GUI being developed on the client computer based on the second change.

6. The computer-implemented method of claim 1, further comprising:
refreshing the GUI being developed on the client computer a first time based on the first change; and
refreshing the GUI being developed on the client computer a second time based on the second change.

7. The computer-implemented method of claim 1, wherein the second change further indicates a change made to a title of a particular column of the graphical user interface component; and
the method further comprising:
responsive to receiving the information indicative of the second change, making a change, at the server system, to a title of a column of the new data object corresponding to the particular column of the graphical user interface.

8. A system comprising one or more processors configured to perform:
automatically receiving, at the system, updated application metadata from a client computer for a graphical user interface (GUI) being developed in a view model on the client computer for an application, the application metadata including an undated data model, and updated view model and an updated mapping information, wherein the updated application metadata indicates a first change to the GUI being developed due to addition of a graphical user interface component to a page of the application in the view model on the client computer, wherein the GUI is developed in accordance with a Model-View-ViewModel (MVVM) architecture;
automatically comparing, by a server-side synchronizer module of the system, the updated data model with a first data model stored in an application store of the system;
determining, by the server-side synchronizer module of the system, a change to the first data model based on the comparison;
automatically updating, during design of the GUI so as to perform a dynamic live update of the first data model, the first data model created for the application based upon the GUI being developed, the updating comprising creating a new data object for the graphical user interface component by updating a database schema created for the application, wherein the new data object created for the graphical user interface component is a table stored in a database;
automatically binding the new data object to the graphical user interface component so as to bind the view model to the first data model during design of the GUI using the received updated mapping information in the updated application metadata;
receiving, at the system from the client computer, metadata information indicative of a second change to the GUI being developed on the client computer, the second change indicating a change to an attribute of the graphical user interface component, wherein the second change is a deletion or an addition of a column to the graphical user interface component;
responsive to receiving the information indicative of the second change, deleting or adding, at the system, a column from or to the new data object corresponding to a column deleted or added by the second change by updating the database schema associated with the first data model for the application; and
while the GUI is being developed on the client computer:
receiving, at the system, data entered into the graphical user interface component on the client computer; and
storing the data in the new data object in the database.

9. The system of claim 8, wherein the graphical user interface component is a graphical table component.

10. The system of claim 8, wherein the application metadata comprises data describing a view structure of the application.

11. The system of claim 8, further comprising refreshing the GUI being developed on the client computer based on the first change.

12. The system of claim 8, further comprising refreshing the GUI being developed on the client computer based on the second change.

13. The system of claim 8, further comprising:
refreshing the GUI being developed on the client computer a first time based on the first change; and
refreshing the GUI being developed on the client computer a second time based on the second change.

14. The system of claim 8, wherein the second change further indicates a change made to a title of a particular column of the graphical user interface component; and
responsive to receiving the information indicative of the second change, making a change, at the system, to a title of a column of the new data object corresponding to the particular column of the graphical user interface.

15. A non-transitory computer-readable storage medium having stored thereon instructions, the instructions comprising:
automatically receiving, at a server system, updated application metadata from a client computer for a graphical user interface (GUI) being developed in a view model on the client computer an application, the application metadata including an updated data model, an updated view model and an updated mapping information, wherein the updated application metadata indicates a first change to the GUI being developed due to addition of a graphical user interface component to a page of the application in the view model on the client computer, wherein the GUI is developed in accordance with a Model-View-ViewModel (MVVM) architecture;
automatically comparing, by a server-side synchronizer module of the server system, the updated data model with a first data model stored in an application store of the server system;
determining, by the server-side synchronizer module of the server system, a change to the first data model based on the comparison;
automatically updating, during design of the GUI so as to perform a dynamic live update of the first data model, the first data model created for the application based upon the GUI being developed on the client computer, the updating comprising creating a new data object for the graphical user interface component by updating a database schema created for the application, wherein the new data object created for the graphical user interface component is a table stored in a database;
automatically binding the new data object to the graphical user interface component so as to bind the view model to the first data model during design of the GUI using the received updated mapping information in the updated application metadata;

receiving, from the client computer, metadata information indicative of a second change to the GUI being developed on the client computer, the second change indicating a change to an attribute of the graphical user interface component, wherein the second change is a deletion or an addition of a column to the graphical user interface component;

responsive to receiving the information indicative of the second change, automatically deleting or adding a column from or to the new data object corresponding to the column deleted or added by the second change by updating the database schema associated with the first data model for the application; and while the GUI is being developed on the client computer:
receiving data entered into the graphical user interface component on the client computer; and
storing the data in the new data object in the database.

16. The non-transitory computer-readable storage medium of claim 15, wherein the application metadata comprises data describing a view structure of the application.

17. The non-transitory computer-readable storage medium of claim 15, the instructions further comprising refreshing the GUI being developed on the client computer based on the first change.

18. The non-transitory computer-readable storage medium of claim 15, the instructions further comprising:
refreshing the GUI being developed on the client computer a first time based on the first change; and
refreshing the GUI being developed on the client computer a second time based on the second change.

19. The non-transitory computer-readable storage medium of claim 15, wherein the second change further indicates a change made to a title of a particular column of the graphical user interface component; and
the instructions further comprising:
responsive to receiving the information indicative of the second change, making a change to a title of a column of the new data object corresponding to the particular column of the graphical user interface.

* * * * *

UNITED STATES PATENT AND TRADEMARK OFFICE
CERTIFICATE OF CORRECTION

PATENT NO. : 10,824,403 B2  
APPLICATION NO. : 15/186414  
DATED : November 3, 2020  
INVENTOR(S) : Fukala Page 1 of 1

It is certified that error appears in the above-identified patent and that said Letters Patent is hereby corrected as shown below:

On the Title Page

On page 2, Column 2, under Other Publications, Line 7, delete "Burs," and insert -- Bors, --, therefor.

In the Specification

In Column 1, Line 49, delete "and or" and insert -- and/or --, therefor.

In Column 4, Line 37, delete "and or" and insert -- and/or --, therefor.

In Column 11, Line 17, delete "a the" and insert -- the --, therefor.

In Column 16, Line 6, delete "in in" and insert -- in --, therefor.

In Column 17, Line 10, delete "metatadat" and insert -- metadata --, therefor.

In Column 25, Line 22, delete "repositoryd" and insert -- repository --, therefor.

In the Claims

In Column 32, Line 17, in Claim 1, after "application" insert -- metadata indicates --.

In Column 32, Line 45, in Claim 1, delete "metadat" and insert -- metadata --, therefor.

In Column 33, Line 29, in Claim 8, delete "undated" and insert -- updated --, therefor.

In Column 33, Line 29, in Claim 8, delete "and" and insert -- an --, therefor.

In Column 33, Line 66, in Claim 8, after "change," insert -- automatically --.

Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*